United States Patent [19]

Kieffer et al.

[11] Patent Number: 4,789,699

[45] Date of Patent: Dec. 6, 1988

[54] AMBIENT TEMPERATURE BONDABLE ELASTOMERIC NONWOVEN WEB

[75] Inventors: John S. Kieffer, Appleton; Tony J. Wisneski, Kimberly, both of Wis.

[73] Assignee: Kimberly-Clark Corporation, Roswell, Ga.

[21] Appl. No.: 919,901

[22] Filed: Oct. 15, 1986

[51] Int. Cl.[4] .................... C08L 53/02; B32B 25/14
[52] U.S. Cl. .................... 524/271; 524/274; 428/221; 428/286; 428/290
[58] Field of Search ............ 524/271, 274; 428/290, 428/286, 221

[56] References Cited

U.S. PATENT DOCUMENTS

| | | | |
|---|---|---|---|
| 2,957,512 | 10/1960 | Wade et al. | 154/33.05 |
| 3,635,861 | 1/1972 | Russell | 524/274 |
| 3,725,330 | 4/1973 | Shirato et al. | 260/33.6 AQ |
| 3,783,072 | 1/1974 | Korpman | 156/244 |
| 4,017,436 | 4/1977 | Tabana et al. | 260/27 BB |
| 4,022,728 | 5/1977 | Trotter | 524/274 |
| 4,089,824 | 5/1978 | Bronstert | 524/274 |
| 4,102,835 | 7/1978 | Freeman et al. | 260/5 |
| 4,136,071 | 1/1979 | Korpman | 260/27 BB |
| 4,136,699 | 1/1979 | Collins et al. | 128/290 R |
| 4,209,563 | 6/1980 | Sisson | 428/288 |
| 4,294,936 | 10/1981 | Korpman | 525/93 |
| 4,301,255 | 11/1981 | Korpman | 525/92 |
| 4,323,534 | 4/1982 | Des Marais | 264/176 R |
| 4,340,563 | 7/1982 | Appel et al. | 264/518 |
| 4,399,249 | 8/1983 | Bildusas | 524/271 |
| 4,432,848 | 2/1984 | Korpman | 524/274 |
| 4,444,953 | 4/1984 | St. Clair | 524/274 |
| 4,446,189 | 5/1984 | Romaner | 428/152 |
| 4,514,554 | 4/1985 | Hughes et al. | 526/339 |
| 4,526,577 | 7/1985 | Schmidt et al. | 604/366 |
| 4,539,364 | 9/1985 | Pollet et al. | 524/488 |
| 4,543,099 | 9/1985 | Bunnelle et al. | 604/385 |
| 4,556,464 | 12/1985 | St. Clair | 524/274 |
| 4,663,220 | 5/1987 | Wisneski et al. | 428/221 |

FOREIGN PATENT DOCUMENTS

| | | |
|---|---|---|
| 212419 | 4/1987 | European Pat. Off. |
| 676987 | 8/1952 | United Kingdom . |
| 1099297 | 1/1968 | United Kingdom . |
| 1217648 | 12/1970 | United Kingdom . |
| 1405786 | 9/1975 | United Kingdom . |
| 1415671 | 11/1975 | United Kingdom . |
| 2112790 | 7/1983 | United Kingdom . |

OTHER PUBLICATIONS

Hercules Inc., Technical Bulletin No. 7348.
Hercules Inc., Material Safety Data Sheet OR 627A.

Primary Examiner—Paul R. Michl
Assistant Examiner—Patrick A. Doody
Attorney, Agent, or Firm—Karl V. Sidor

[57] ABSTRACT

An extrudable composition for forming nonwoven elastomeric material having pressure sensitive adhesive properties, nonwoven elastomeric sheet material (e.g., fibrous nonwoven webs) formed of such composition, stretch bonded laminates using such sheets, and methods of forming such sheets and such laminates, are disclosed. The composition includes an elastomeric polymer and a tackifying resin, and can also include a polyolefin. The nonwoven sheet material can be a meltblown nonwoven web. The laminate can be formed by tensioning the elastomeric sheet material and bonding a gatherable web (e.g., a spunbond polypropylene web) to the tensioned sheet material by application of pressure, the bonding being accomplished due to the adhesivity of the elastomeric sheet material and without application of heat for softening the sheet material and/or gatherable web.

36 Claims, 1 Drawing Sheet

AMBIENT TEMPERATURE BONDABLE ELASTOMERIC NONWOVEN WEB

BACKGROUND OF THE INVENTION

The present invention relates to an extrudable composition for forming a nonwoven web (e.g., a film, sheet, etc.) of a pressure sensitive elastomer adhesive, methods of utilizing such composition, and products formed utilizing such composition. More particularly, the present invention relates to fibrous nonwoven webs, especially meltblown webs, of such composition, and stretch bonded laminates using a web of such composition. Moreover, the present invention relates to methods of forming nonwoven webs, particularly fibrous nonwoven webs, utilizing such composition and use of such webs for forming stretch bonded laminates, wherein such elastomeric web is stretched and, while stretched, bonded to at least one layer of gatherable material.

For some time those in the art have been attempting to form elastomeric resins into fibrous nonwoven elastomeric webs. For example, attempts have been made to form fibrous nonwoven elastomeric webs utilizing KRATON®G elastomeric resins. KRATON® is a trademark of Shell Chemical Company of Houston, Tex., for various polystyrene/poly(ethylene-butylene)/polystyrene elastomeric block copolymers. In U.S. Pat. No. 4,323,534, it is disclosed that the KRATON®G rubber resins are too viscous to be extruded alone without substantial melt fracture of the product; and that various of the KRATON®G resins should be blended with a fatty chemical such as stearic acid prior to extrusion and, e.g., meltblown, so as to overcome the viscosity problem. However, physical properties of the product obtained by this process, for example, a nonwoven mat of meltblown fibers, were apparently unsatisfactory because, after formation of the nonwoven web, substantially all the fatty chemical is leached out of the nonwoven web of extruded microfibers by soaking the web in alcohols having a good ability to solubilize the fatty chemical utilized.

In order to overcome, e.g., the above-stated viscosity problems, it has been proposed to form elastomeric block copolymer materials into nonwoven elastomeric products by providing extrudable elastomeric compositions which are blends of (1) an A-B-A' block copolymer, where "A" and "A'" are the same or different and are each a thermoplastic polymer endblock which includes a styrenic moiety such as a poly(vinyl arene) and where "B" is an elastomeric poly(ethylene-butylene) midblock, with (2) a polyolefin which, when blended with the A-B-A' block copolymer and subjected to appropriate elevated pressure and elevated temperature conditions, is extrudable in blended form, with the A-B-A' block copolymer. The presence of the polyolefin in the blend serves to reduce the viscosity of the composition as compared to the viscosity of the pure A-B-A' block copolymer and thus enhances the extrudability of the composition. Such blend must be a composition which, after extrusion, solidifies to form elastomeric products.

Thus, utilizing a blend of the block copolymer and the polyolefin, the composition can be extruded at conventional temperatures and pressures, and, in particular, can be extruded at temperatures lower than temperatures at which the block copolymers degrade or burn. The extrudable composition may be formed into a variety of products such as, for example, fibrous nonwoven elastomeric webs preferably having microfibers with an average diameter not greater than about 100 microns, and preferably having an average basis weight of not more than about 300 grams per square meter, for example, an average basis weight of from about 5 grams per square meter to about 100 grams or more per square meter. In connection with this extrudable composition, note U.S. Pat. No. 4,663,220 which issued on May 5, 1987 of Tony J. Wisneski and Michael T. Morman, for "Polyolefin-Containing Extrudable Compositions and Methods for Their Formation Into Elastomeric Products", the contents of which are incorporated herein by reference.

Moreover, uses for nonwoven elastomeric webs, either by themselves or as part of a composite laminate, are being investigated. Thus, composite fabrics comprising at least one layer of nonwoven textile fabric mechanically secured to an elastomeric layer are known. For example, U.S. Pat. No. 4,446,189 discloses textile laminate materials comprising an inner layer of elastic material, such as a polyurethane foam of a thickness of about 0.025 inches, needle punched at a plurality of locations to a nonwoven textile fabric layer. The needle punched superposed layers are then stretched within the elastic limits of the elastic layer to permanently stretch the nonwoven fabric layer material needle punched thereto. When the elastic layer is allowed to relax and return to substantially its condition prior to being stretched, the nonwoven fabric layer is stated to exhibit increased bulk by virtue of the relaxation of its permanently stretched fibers.

Moreover, U.S. Pat. No. 4,209,563 discloses a method of making an elastic material which includes continuously forwarding relatively elastomeric fibers and elongatable but relatively non-elastic fibers onto a forming surface and bonding at least some of the fiber crossings to form a coherent cloth which is subsequently mechanically worked, as by stretching, following which is it allowed to relax. As described by the patentee at column 8, line 19 et seq, the elastic modulus of the cloth is substantially reduced after the stretching, resulting in the permanently stretched non-elastic filaments relaxing and looping to increase the bulk and improve the feel of the fabric. This patent discloses that the bonding of the filaments to form the coherent cloth may utilize embossing patterns or smooth, heated roll nips.

U.S. Pat. No. 2,957,512 concerns a method of producing elastic composite sheet materials and discloses that a reticulated, fibrous web formed of an elastomeric material such as rubber, including butadiene-styrene copolymers, may be utilized as the elastic ply of a composite material. The patent discloses that a relaxed sheet material ply may have a fibrous web of elastomeric material of smaller area than the sheet material stretched so as to conform it in area to the area of the sheet material and the plies are bonded together at spaced points or areas. Upon allowing the fibrous elastomeric ply to relax, the composite body is stated to assume a structure of a fibrous web of elastomeric material bonded at spaced areas or lines to a ply of a creped or corrugated flexible sheet material.

Furthermore, it has been proposed to provide a composite elastic material comprising at least one gatherable web bonded to at least one elastic web, wherein the elastic web (which may comprise a fibrous web such as a nonwoven web of elastomeric fibers, e.g., meltblown elastomeric fibers) is tensioned to elongate it; the elongated elastic web is bonded to at least one gatherable web under conditions which soften at least portions of the elastic web to form a bonded composite web; and (c) the composite web is relaxed immediately after the bonding step whereby the gatherable web is gathered to form the composite elastic material. Such proposed method includes bonding the elongated elastic web to the gatherable web by overlaying the elastic and gatherable webs and applying heat and pressure to the overlaid webs, for example, by heating bonding sites on the elastic web to a temperature from at least about 65° C. to about 120° C., preferably from at least about 70° C. to about 90° C. In such proposed method, the elastomeric fibers may be formed from (1) A-B-A' block copolymers, wherein A and A' may be the same or different endblocks and each is a thermoplastic polymer endblock or segment which contains a styrenic moiety such as polystyrene or polystyrene homologs, and B is an elastomeric polymer midblock or segment, e.g., a midblock selected from the group including poly(ethylene-butylene), polyisoprene and polybutadiene, or (2) blends of one or more polyolefins with the A-B-A' block copolymers, the polyolefin being selected from one or more of polyethylene, polypropylene, polybutene, ethylene copolymers, propylene copolymers and butene copolymers. The gatherable web can be a non-woven, non-elastic material, preferably one composed of fibers formed from materials selected from the group including polyester fibers, e.g., poly(ethylene-terephthalate) fibers, polyolefin fibers, polyimide fibers, e.g., nylon fibers, cellulosic fibers, e.g., cotton fibers and mixtures thereof. In connection with this proposed composite elastomeric material and method, note U.S. patent application Ser. No. 760,437, filed July 30, 1985, of Jack D. Taylor and Michael J. Vander Wielen, for "Composite Elastomeric Material and Process for Making the Same", the contents of which are incorporated herein by reference.

In this proposed method for making composite elastomeric materials, bonding between the layers of the laminate are provided by means of, for example, thermal bonding or ultrasonic welding, which will soften at least portions of at least one of the webs, so as to effectuate bonding by heat application and pressure. Due to the bonding of the films with heating, and since the elastomeric film is bonded in its stretched state, the difficulty arises that such bonding while applying heat renders the elastomeric web susceptible to losing its ability to contract if it is allowed to cool, even briefly, in the stretched condition. A proposed technique for overcoming this difficulty is to allow the composite web to immediately contract after bonding. However, such requirement to immediately relax the composite after bonding imposes an additional condition on the procedure. Moreover, additional problems arise due to use of heating during bonding. Thus, the number of breaks of the web are disadvantageously high, and burn-through (aperturing of the elastomeric web at the bonding points) and undesirable re-setting of the elastomeric meltblown occur due to the relatively high bonding temperatures.

Furthermore, utilizing, e.g., KRATON ®/polyethylene blends for forming the elastomeric web, it is very difficult to bond such elastomeric web to various desirable materials, such as spunbond polypropylene, as, e.g., the gatherable web of the composite material.

Various pressure-sensitive adhesive compositions are known. For example, U.S. Pat. No. 4,294,936 discloses pressure-sensitive adhesive compositions comprising (1) a synthetic rubbery thermoplastic block copolymer, e.g., an A-B-A or A-B block copolymer, where the A blocks are thermoplastic blocks and the B blocks are rubbery blocks and may be linear, branched or radial, or a mixture thereof; (2) a non-rubbery polymer which is preferably a copolyester, e.g., one of at least two different ester units; and a tackifier resin. As examples of the block copolymers are described KRATON ®1102 (a styrene-butadiene-styrene block copolymer) and KRATON ®1107 (a styrene-isoprene-styrene block copolymer). As the non-rubbery component is disclosed a copolyester, although polyethylene and polypropylene may be used. As the tackifier resin is disclosed rosin and dehydrogenated rosin, and oil soluble phenol-formaldehyde resins, among others. This patent further discloses that the adhesive composition can be applied by blending and melting the materials in an extruder and directly coating onto a suitable backing; and that the adhesives may be applied to, inter alia, non-woven fabrics.

U.S. Pat. No. 3,783,072 discloses processes for producing normally tacky and pressure-sensitive adhesive sheets and tapes, by extrusion, wherein a blend of A-B-A block copolymer (wherein A is a thermoplastic polymer block derived from styrene and B is an elastomeric polymer block derived from isoprene) and a solid tackifier is extruded onto a backing sheet. As the tackifier agent is disclosed conventional compatible solid tackifier agents including hydrocarbon resins or the like. KRATON ®1107 thermoplastic elastomer block copolymer is disclosed as a material which can be utilized in the described adhesive formulation.

U.S. Pat. No. 4,543,099 discloses pressure-sensitive adhesives for imparting elastic characteristics to materials which are relatively inelastic, by extruding hot melt pressure-sensitive adhesive into contact with a substrate, the hot melt pressure-sensitive adhesive comprising (1) a rubbery block copolymer which includes a rubbery midblock portion terminated with crystalline vinyl arene blocks; (2) a tackifying resin generally compatible with and generally associated with the midblock portion of the block copolymer; and (3) an aromatic, essentially hydrocarbon resin having a glass transition temperature and a softening point above those of the tackifying resin and the endblocks of the block copolymer. This patent discloses that the block copolymers which can be used include KRATON ®, and the tackifying resins can include natural and synthetic essentially hydrocarbon resins.

U.S. Pat. No. 4,539,364 discloses hot melt sizes for glass fibers, applied as a hot melt to the glass fibers as they are formed so as to provide a coating on the glass fibers. The described hot melt size consists of a thermoplastic, block copolymer rubber, such as KRATON ®; a low molecular weight polyethylene wax; and any low molecular weight resin compatible with the end styrenic block of the rubber block copolymer, the resin preferably being a hydrogenated styrene/methyl styrene copolymer having a weight average molecular weight of about 1000, a melt viscosity of 1 poise at 209° C., and a glass transition temperature of about 65° C., one particularly suitable hydrocarbon low molecular weight resin being REGALREZ ® resin 1126 available from Hercules Incorporated.

Despite the foregoing, a void exists with respect to elastomeric composite materials (e.g., elastomeric composite laminates) that can be easily manufactured and that have desirable properties. Moreover, a void exists with respect to extrudable compositions for forming elastomeric sheet materials, e.g., for such composite materials, that can be used to easily form the elastomeric sheet materials (e.g., fibrous nonwoven webs such as meltblown webs). Furthermore, a void exists with respect to such elastomeric sheet materials which can be used to impart elastomeric properties to a composite laminate, with bonding between the elastomeric sheet material and another sheet (e.g., web) of such composite laminate being accomplished without the necessity of high temperatures.

SUMMARY OF THE INVENTION

Accordingly, it is an object of the present invention to provide an extrudable composition, which can be extruded into an elastomeric nonwoven sheet (e.g., a film or web), particularly a fibrous elastomeric nonwoven web, even more particularly which fibrous elastomeric nonwoven web can be formed by meltblowing, the elastomeric nonwoven sheet having both elastic and adhesive properties.

It is a further object of the present invention to provide an elastomeric nonwoven material, particularly a fibrous elastomeric nonwoven web, more particularly wherein such web is a meltblown web, which material can act as an adhesive, and a method of forming such material by extrusion.

It is a further object of the present invention to provide a composite material (e.g., a composite laminate) including an elastomeric nonwoven sheet, wherein the bonding between such elastomeric nonwoven sheet and another sheet of the composite material can be performed without application of high temperatures during bonding (e.g., at ambient temperature), and a method of forming such composite material.

It is a further object of the present invention to provide a composite material, and method of forming such material, wherein at least one sheet of the laminate is a fibrous elastomeric nonwoven web, having adhesive properties, which can be bonded to layers of various other materials, including spunbond polypropylene, without application of high temperatures.

It is an even further object of the present invention to provide a composite material, including an elastomeric nonwoven web, particularly a fibrous elastomeric nonwoven web, even more particularly such fibrous nonwoven elastomeric web formed by meltblowing, wherein the laminate is a stretch bonded laminate, another layer of the laminate (other than the elastomeric web) being of a gatherable material.

The present invention achieves each of the above objects by various techniques as described below, but each technique utilizes a tackifying resin incorporated as part of the extrudable composition for forming the elastomeric nonwoven material. While not limited thereto, the extrudable composition of the present invention can preferably comprise (1) an elastomeric polymer; (2) a polyolefin; and (3) a tackifying resin. The composition must be extrudable, and able to form a solid elastomeric material by such extrusion. Thus, the composition must contain a sufficient amount of elastomeric polymer for the extruded material to be elastomeric. Moreover, such composition must include a sufficient amount of the tackifying resin such that the extruded material (e.g., sheet) can act as a pressure sensitive adhesive.

The polyolefin is added for the purpose of reducing the viscosity of the extrudable composition, so that the composition can be extruded (e.g., meltblown) at a sufficiently low temperature such that the elastomeric polymer is not degraded and/or burned. Substances other than a polyolefin can be used for the viscosity-reducing function, whereby the polyolefin is unnecessary, and in a specific embodiment the tackifying resin itself (e.g., a low molecular weight hydrocarbon resin) can be used as the viscosity-reducer, in addition to providing a tackifying function, where such resin can sufficiently reduce the viscosity of the composition to achieve the objectives of the present invention (e.g., permit extrusion at sufficiently low temperatures so as to avoid degradation and/or burning of the elastomeric polymer).

In connection with including polyolefins in the composition, as indicated in the above-discussed U.S. Pat. No. 4,663,220 which issued on May 5, 1987 of Tony J. Wisneski and Michael T. Morman for "Polyolefin-Containing Extrudable Compositions and Methods for Their Formation Into Elastomeric Products" various polyolefins can be utilized, in amounts such that the entire composition has a sufficiently low viscosity to be extruded at sufficiently low temperatures to avoid degradation and/or burning of the block copolymer.

By use of the composition including at least the elastomeric polymer and tackifying resin, and a composition also including the polyolefin, an elastomeric nonwoven material, e.g., a web of fibrous elastomeric nonwoven material, such as a meltblown elastomeric web, can be formed and such elastomeric nonwoven material can be utilized as a pressure sensitive adhesive for bonding to a gatherable material, such as spunbond polypropylene, at relatively low temperatures. More particularly, such nonwoven elastomeric web can be stretched and, while stretched, bonded (for example, at a temperature in the range of 60° to 180° F., preferably lower temperatures, in the range of 100° to 140° F., e.g., at ambient temperature, without substantial heating of the web for bonding purposes) to a web of gatherable material, whereupon after relaxation of the stretching of the elastomeric web a composite material having elasticity is formed.

DETAILED DESCRIPTION OF THE INVENTION

Figure 1:
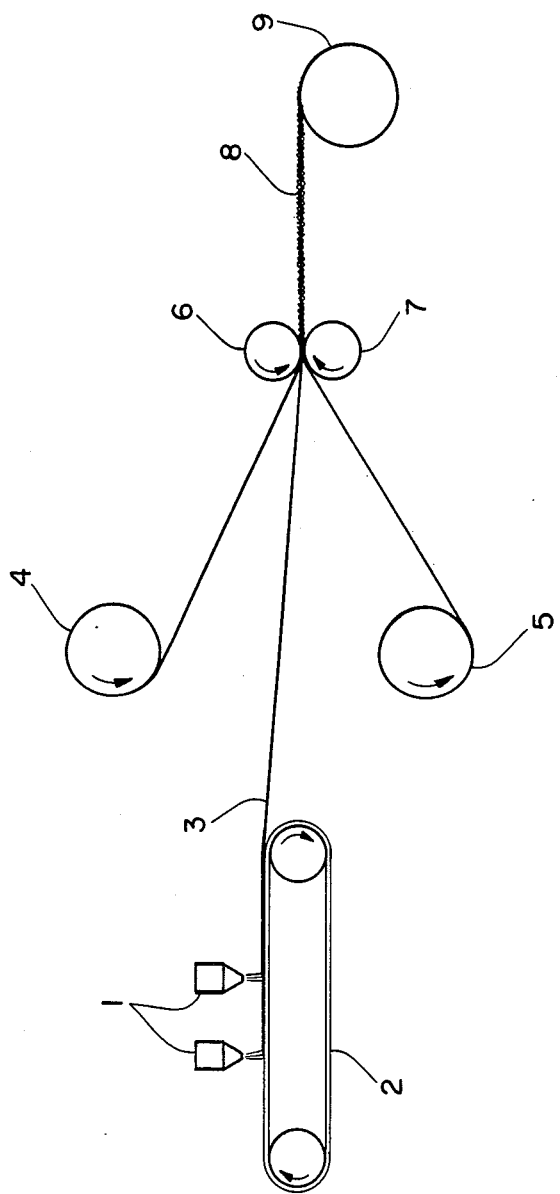
FIG. 1 is a schematic illustration of a continuous manufacturing in-line process for stretch bond laminating gatherable webs to each of the two opposite sides of an elastomeric web.

While the invention will be described in connection with specific and preferred embodiments, it will be understood that it is not intended to limit the invention to those embodiments. On the contrary, it is intended to cover all alterations, modifications and equivalents as may be included within the spirit and scope of the invention as defined by the appended claims. Prior to more specifically describing the invention, various terms used throughout will be defined. Thus, the term "compatible" is used to refer to the relationship of one polymeric material to another with respect to the extrusion process and extrudates. To be compatible, two different polymeric materials must have similar rheological behavior, they must form a homogeneous melt, and after being blown into fibers and solidifying, must form a homogeneous solid product.

The terms "elastic" and "elastomeric" are used interchangeably to mean that property of any material that, upon application of a biasing force, permits that material to be stretchable to a stretched, biased length which is at least about 125%, that is about 1¼ times, its relaxed, unbiased length, and that will cause the material to recover at least 40% of its elongation upon release of the stretching, elongating force. A hypothetical example which would satisfy this definition of an elastomeric material would be a one (1) inch sample of a material which is elongatable to at least 1.25 inches and which, upon being elongated to 1.25 inches and released, will recover to a length of not more than 1.15 inches. Many elastic materials may be stretched by much more than 25% of their relaxed length and many of these will recover to substantially their original relaxed length upon release of the stretching, elongating force. This latter class of materials is generally preferred for purposes of the present invention.

The term "recover" relates to a contraction of a stretched material upon termination of a biasing force following stretching of the material by application of the biasing force. For example, if a material having a relaxed, unbiased length of one (1) inch were elongated 50% by stretching to a length of 1½ (1.5) inches, the material would have been elongated 50% and would have a stretched length that is 150% of its relaxed length. If this exemplary stretched material contracted, that is, recovered to a length of 1 1/10 (1.1) inches after release of the biasing and stretching force, the material would have recovered 80% (0.4 inch) of its elongation.

The term "microfibers" refers to small diameter fibers having an average diameter not greater than about 200 microns, preferably having diameters in the range from about 0.5 micron to about 50 microns, more preferably having an average diameter of from about 4 microns to about 40 microns. Microfibers may be meltblown by extruding a molten thermoplastic material through a plurality of small diameter, usually circular die capillaries as molten threads and attenuating the molten threads by application of a high velocity gas, usually air, stream to reduce their diameters to be within the range stated above.

The term "spunbond" material refers to a material made by extruding a molten thermoplastic material as filaments through a plurality of capillaries of a spinnerett, with the diameter of the extruded filaments then being reduced by, for example, eductive drawing or other well-known spunbonding mechanisms. The product of spunbonded nonwoven webs, as well as methods for making such spunbonded nonwoven webs, is illustrated in U.S. Pat. No. 4,340,563 to Appel, and the disclosure of this patent is hereby incorporated herein by reference.

The term "fibrous nonwoven web" means a web of material which has been formed without the use of a weaving process. A fibrous nonwoven web has a structure of individual fibers or threads which are interlaid, but not in an identifiable, repeating manner. Fibrous nonwoven webs in the past have been formed by a variety of processes such as, for example, meltblowing processes, spunbonding processes, film aperturing processes and staple fiber carding processes. These fibrous nonwoven webs generally have an average basis weight of not more than about 300 grams per square meter, and preferably have an average basis weight from about 15 grams per square meter to about 100 grams per square meter.

As indicated previously, the extrudable composition of the present invention includes an elastomeric polymer, for example, an elastomeric block copolymer. Exemplary block copolymers include the A-B-A' or A-B block copolymer, with A being a thermoplastic polymer block, e.g., containing a styrenic moiety such as a poly(vinyl arene), and where B is an elastomeric polymer block, such as a conjugated diene or a lower alkene polymer. Such block copolymer of the A-B-A' type can have different or the same thermoplastic block polymers for the A and A' blocks, and the present block copolymers are intended to embrace linear, branched and radial block copolymers. In this regard, the radial block copolymers may be designated $(A-B)_m X$, wherein X is a polyfunctional atom or molecule and in which each (A-B) radiates from X in a way that A is an endblock. In the radial block copolymer, X may be an organic or inorganic polyfunctional atom or molecule and n is an integer having the same value as the functional group originally present in X. It is usually at least 3, and is frequently 4 or 5, but is not limited thereto. Thus, in the present invention, the expression "block copolymer", and particularly "A-B-A'" and A-B block copolymer, is intended without qualification to embrace all block copolymers having such rubbery blocks and thermoplastic blocks as discussed above, which can be extruded (e.g., by meltblowing), and without limitation as to the number of blocks. As for various block copolymers, attention is directed to U.S. Pat. No. 4,301,255, the contents of which are incorporated herein by reference.

Of these block copolymers, the preferred are those of the A-B-A' type, wherein A and A' can be the same or different and are thermoplastic endblocks, and B is a rubbery midblock. Block copolymers within the scope of A-B-A' block copolymers include the KRATON®G block copolymers. In particular, two specific KRATON® polymers useful in the present invention are KRATON®G-1652 and KRATON®GX-1657. Such rubbery block copolymers are polystyrene/poly(ethylene-butylene)/polystyrene block copolymers, with the 1652 designation having a weight ratio of polystyrene A endblocks to poly(ethylene-butylene) B midblocks of 29:71, and the 1657 designation having such weight ratio of 14:86. Various properties of these two designations of KRATON®G are set forth in the following table.

TABLE 1

| PROPERTY | KRATON ® G | |
|---|---|---|
| | G-1652 | GX-1657 |
| Tensile Strength psi | 4,500[2] | 3,400[2] |
| 300% Modulus, psi[1] | 700 | 350 |
| Elongation, %[1] | 500 | 750 |
| Set at Break, % | — | — |
| Hardness, Shore A | 75 | 65 |
| Specific Gravity | 0.91 | 0.90 |
| Brookfield Viscosity, (Toluene Solution) cps at 77° F. | 550[3] | 1,100[3] |
| Melt Viscosity, Melt Index, Condition G, gms/10 min. | — | — |
| Plasticizer Oil Content, % w | 0 | 0 |
| Styrene/Rubber[4] Ratio | 29/71 | 14/86 |

TABLE 1-continued

| | KRATON ® G | |
|---|---|---|
| PROPERTY | G-1652 | GX-1657 |
| Physical Form | Crumb | Pellet |

[1] ASTM method D 412-tensile test jaw separation speed 10 in./min.
[2] Typical properties determined on film cast from a toluene solution
[3] Neat polymer concentration, 20% w
[4] The ratio of the sum of the molecular weights of the endblocks (A + A'') to the molecular weight of the B midblock. For example, with respect to KRATON ® G-1652, the sum of the molecular weights of the two endblocks (A + A') is 29 percent of the molecular weight of the A-B-A' block copolymer.

Of course, the present invention is not limited to use of such KRATON®G rubbery block copolymers as the elastomeric polymer of the present invention, and attention is directed to, e.g., the various thermoplastic rubbers which are block copolymers and characterized by having a styrenic moiety such as a poly(vinyl arene) and elastomeric polymer midblocks such as conjugated dienes or alkene polymers as set forth in U.S. Pat. No. 4,301,255 to Korpman, the contents of which have already been incorporated herein by reference. Reference is also made to the various elastomeric materials used in forming the fibrous elastic webs in Application Ser. No. 760,437, filed July 30, 1985, of Jack D. Taylor and Michael J. Vander Wielen for "Composite Elastomeric Material and Process for Making the Same", and U.S. Pat. No. 4,663,220 which issued on May 5, 1987 of Tony J. Wisneski and Michael T. Morman for "Polyolefin-Containing Extrudable Compositions and Methods for Their Formation Into Elastomeric Products", the contents of which two U.S. patent applications have previously been incorporated by reference in this application. Thus, generally, any elastomeric polymer which is capable of being extruded (e.g., thermoplastic) into a solid elastomeric material as part of the composition of the present invention (including, e.g., a tackifying resin) is within the contemplation of the present invention.

The polyolefin which is utilized in the extrudable composition must be one which, when blended with the A-B-A' block copolymer and subjected to an appropriate combination of elevated pressure and elevated temperature conditions, is extrudable, in blended form, with the A-B-A' block copolymer. In particular, preferred polyolefin materials include polyethylene, polypropylene and polybutene, including ethylene copolymers, propylene copolymers and butene copolymers. Blends of two or more of the polyolefins may be utilized.

A particularly preferred polyethylene may be obtained from U.S.I. Chemical Company under the trade designation Petrothene Na601 (also referred to herein as PE Na601). Information obtained from U.S.I. Chemical Company states that the Na601 is a low molecular weight, low density polyethylene for application in the areas of hot melt adhesives and coatings. U.S.I. has also stated that the Na601 has the following nominal values: (1) a Brookfield viscosity, cP at 150 degrees Centigrade of 8,500 and at 190 degrees Centigrade of 3,300 when measured in accordance with ASTM D 3236; (2) a density of 0.903 grams per cubic centimeter when measured in accordance with ASTM D 1505; (3) an equivalent Melt index of 2,000 grams per 10 minutes when measured in accordance with ASTM D 1238; (4) a ring and ball softening point of 102 degrees Centigrade when measured in accordance with ASTM E 28; (5) a tensile strength of 850 pounds per square inch when measured in accordance with ASTM D 638; (6) an elongation of 90% when measured in accordance with ASTM D 638; (7) a modulus of rigidity, $T_F$ (45,000) of −34 degrees Centigrade; and (8) a penetration hardness (tenths of mm) at 77 degrees Fahrenheit of 3.6.

The Na601 has a number average molecular weight (Mn) of about 4,600; a weight average molecular weight (Mw) of about 22,400 and a Z average molecular weight of about 83,300. The polydispersity (Mw/Mn) of the Na601 is about 4.87. Mn, Mw and Mz as indicated previously, are calculated by the following formulae:

Mn is calculated by the formula:

$$Mn = \frac{Sum[(n)\,(MW)]}{Sum\,(n)}$$

Mw is calculated by the formula:

$$Mw = \frac{Sum\,[(n)\,(MW)^2]}{Sum\,[(n)\,(MW)]}$$

Mz is calculated by the formula:

$$Mz = \frac{Sum\,[(n)\,(MW)^3]}{Sum\,[(n)\,(MW)^2]}$$

where:
MW = The various molecular weights of the individual molecules in a sample, and
n = The number of molecules in the given sample which have a given molecular weight of MW.

Of course, the present invention is not limited to use of such specific polyolefin described herein. In this regard, note the polyolefins as described in U.S. Pat. No. 4,663,220 which issued on May 5, 1987 of Tony J. Wisneski and Michael T. Morman for "Polyolefin-Containing Extrudable Compositions and Method for Their Formation Into Elastomeric Products", the contents of which have previously been incorporated herein by reference. More generally, and noting the specific purpose of the polyolefin, as described in the U.S. patent application of Tony J. Wisneski and Michael T. Morman, various polyolefins which can be utilized in the present invention can easily be determined.

Various tackifying resins which can be used in the present invention will now be set forth. In particular, the purpose of the tackifying resin is to provide an elastomeric web that can act as a pressure sensitive adhesive, e.g., to bond the elastomeric sheet to a gatherable web. Of course, various tackifying resins are known, and are discussed, e.g., in the previously mentioned U.S. Pat. Nos. 4,294,936 and 3,783,072, the contents of which, with respect to the tackifier resins, are incorporated herein by reference. Any tackifier resin can be used which is compatible with the elastomeric polymer and the polyolefin, and can withstand the high processing (e.g., extrusion) temperatures. Generally, hydrogenated hydrocarbon resins are preferred tackifying resins, because of their better temperature stability. In the following paragraphs are disclosed information on three specific tackifying resins, two of which (REGALREZ® and ARKON®P series tackifiers) are examples of hydrogenated hydrocarbon resins, and the ZONATAC®501 lite being a terpene hydrocarbon. Of course, while the three tackifying resins are specifically discussed, the present invention is not limited to use of such three tackifying resins, and other tackifying resins which are compatible with the other components of the composition and can withstand the high processing temperatures, and can achieve the objectives of the present invention, can also be used.

REGALREZ® hydrocarbon resins, a product of Hercules, Incorporated, are fully hydrogenated styrene-type low molecular weight hydrocarbon resins, produced by polymerization and hydrogenation of pure monomer hydrocarbon feed stocks. Grades 1094, 3102, 6108 and 1126 are highly stable, light-colored low molecular weight, nonpolar resins suggested for use in plastics modification, adhesives, coatings, sealants and caulks. The resins are compatible with a wide variety of oils, waxes, alkyds, plastics and elastomers and are soluble in common organic solvents. Product specifications of the above-mentioned four grades of REGALREZ® hydrocarbon resins, and compatibility information for such four grades, are set forth below respectively in Tables 2 and 3.

TABLE 2

| | REGALREZ ® Resins | | | |
|---|---|---|---|---|
| | 1094 | 3102 | 6108 | 1126 |
| Softening point, R&B, °C. | 90–98 | 98–106 | 104–112 | 122–130 |
| Color | | crystal-clear | | |
| Typical Properties | | | | |
| Softening point, R&B, °C. | 94 | 102 | 108 | 126 |
| Color | | crystal-clear | | |
| Acid number | | <1 | | |
| Saponification number | | <1 | | |
| Specific gravity at 21° C. | 0.99 | 1.04 | 1.01 | 0.97 |
| Flashpoint, COC, °C. (°F.) | 235(455) | 293(560) | 243(470) | 243(470) |
| Melt viscosity, °C. | | | | |
| 1 poise | 190 | 196 | 200 | 209 |
| 10 poises | 151 | 164 | 168 | 182 |
| 100 poises | 126 | 149 | 143 | 159 |
| Glass transition (Tg), °C. | 33 | 51 | 52 | 65 |

TABLE 3

| Compatibility Information | | | | |
|---|---|---|---|---|
| | REGALREZ ® Resins | | | |
| Compatibility With | 1094 | 3102 | 6108 | 1126 |
| Natural rubber | G | G | G | G |
| SBR 1011 | P | G | G | P |
| KRATON 1107 (MB) | G | G | E | G |
| KRATON 1101 (MB) | P | F | G | P |
| Styrene end block copolymers | P | G | F | P |
| KRATON "G" (MB) | G | F | G | G |
| E/VA copolymers | | | | |
| (low vinyl acetate content) | E | F | G | E |
| (high vinyl acetate content) | P | E | F | P |
| Paraffin wax | E | G | E | E |
| Microcrystalline wax | E | G | E | E |

KEY: E = Excellent; G = Good; F = Fair; P = Poor

Moreover, REGALREZ®1126 has the following molecular weight, as determined by refractive index indicator: (1) weight average molecular weight (Mw)=1385; (2) number average molecular weight (Mn)=919; (3)Mw/Mn=1.51.

ARKON®P series resins, a product of Arakawa Chemical (U.S.A.), Inc., is a synthetic tackifying resin for pressure-sensitive adhesives which is based on petroleum hydrocarbon resins, such tackifying resins being colorless and odorless, with resistance to weather and heat, and having the general properties as set forth in the following Table 4:

TABLE 4

| | AR-KON P-70 | AR-KON P-90 | AR-KON P-100 | AR-KON P-115 | ARKON P-125 |
|---|---|---|---|---|---|
| Color number (Hansen) | 50 | 50 | 50 | 50 | 50 |
| Softening point | 70° C. | 90° C. | 100° C. | 115° C. | 125° C. |
| Acid number | 0 | 0 | 0 | 0 | 0 |
| Specific gravity (20° C.) | — | 0.973 | 0.982 | 0.985 | 0.989 |
| Refractive index (20° C.) | — | 1.515 | 1.519 | 1.523 | 1.530 |
| Molecular Weight | — | 650 | 700 | 850 | 1000 |
| Ash (%) | — | 0.05 | 0.05 | 0.05 | 0.05 |
| Dielectric constant | | | | | |
| 50 MC | — | 2.3 | 2.3 | 2.3 | 2.3 |
| 1000 MC | — | 2.3 | 2.3 | 2.3 | 2.3 |
| Loss tangent | | | | | |
| 50 MC | — | 0.0001 max | 0.0001 max | 0.0001 max | 0.0001 max |
| 1000 MC | — | 0.0001 max | 0.0001 max | 0.0001 max | 0.0001 max |

ZONATEC®501 lite resin, a product of Arizona Chemical Co., has a softening point of 105° C., a Gardner color 1963 (50% in heptane) of 1− and a Gardner color neat (pure) of 2+; a color (approximate Gardner color equal to 1− (50% in heptane); APHA color=70) of water white, a specific gravity (25°/25° C.) of 1.02 and a flash point (closed cup, °F.) of 480° F.

The components of the composition of the present invention can be utilized over broad ranges of the amounts of each component, such amounts being easily determinable by one of ordinary skill in the art. As a guide, when utilizing an A-B-A block copolymer, a polyolefin, and REGALREZ® as the three components of the extrudable composition, the following broad and preferred ranges, as shown in Table 5, are exemplary. It is emphasized that these ranges are merely illustrative, serving as a guide for amounts of the various components in the composition.

TABLE 5

| Polymer | Broad Range | Preferred Range |
|---|---|---|
| A-B-A block Copolymer | 40–80% | 60–70% |
| Polyolefin | 5–40% | 15–25% |
| REGALREZ | 5–30% | 10–20% |

As stated previously, while the present invention has been discussed in terms of a three-component extrudable composition of (1) elastomeric polymer; (2) polyolefin; and (3) tackifying resin, the polyolefin, whose function is a viscosity-reducer for the total composition (as compared with the viscosity of the elastomeric polymer per se), can be substituted by other compatible viscosity reducers, or can be eliminated altogether where the tackifying resin can also act as the viscosity reducer. For example, low molecular weight hydrocarbon resins such as REGALREX® can also act as the viscosity reducer, whereby the extrudable composition can be comprised of the elastomeric polymer and tackifying resin (e.g., REGALREZ®).

While the principal components of the extrudable composition of the present invention have been described in the foregoing, such extrudable composition is not limited thereto, and can include other components not adversely effecting the composition attaining the stated objectives. Exemplary materials which could be used as additional components would include, without limitation, pigments, antioxidants, stabilizers, surfactants, waxes, flow promoters, solid solvents, particulates and materials added to enhance processability of the composition.

As indicated previously, the extrudable composition can be formed into a nonwoven web (e.g., a film, porous film or fibrous nonwoven web) by known extrusion techniques. A preferred extrusion technique is to form a fibrous nonwoven elastomeric web by meltblowing techniques. Meltblowing processes generally involve extruding a thermoplastic polymer resin through a plurality of small diameter capillaries of a meltblowing die as molten threads into a heated gas stream (the primary air stream) which is flowing generally in the same direction as that of the extruded threads so that the extruded threads are attenuated, i.e., drawn or extended, to reduce their diameter to fiber or preferably microfiber size. The thus formed microfibers are then borne away from the vicinity of the die by the gas stream. The gas stream is directed onto a foraminous member, such as a screen belt or a screen drum which is moving over a vacuum box, so that the gas-borne fibers impinge upon and are collected on the surface of the foraminous member and form a cohesive fibrous nonwoven web. Meltblowing die arrangements usually extend across the foraminous collecting member in a direction which is substantially transverse to the direction of movement of the collecting surface. The die arrangements include a plurality of small diameter capillaries arranged linearly along the transverse extent of the die with the transverse extent of the die being approximately as long as the desired width of the fibrous nonwoven web which is to be produced. That is, the transverse dimension of the die is the dimension which is defined by the linear array of die capillaries. Typically, the diameter of the capillaries will be on the order of from about 0.01 inches to about 0.02 inches, for example, from about 0.0145 to about 0.018 inches. From about 5 to about 50 such capillaries will be provided per linear inch of die face. Typically, the length of the capillaries will be from about 0.05 inches to about 0.20 inches, for example, about 0.113 inches to about 0.14 inches long. A meltblowing die can extend for from about 30 inches to about 60 or more inches in length in the transverse direction.

Such meltblowing techniques, and apparatus therefor, are known in the art, and are discussed fully in U.S. Pat. No. 4,663,220 which issued on May 5, 1987 of Tony J. Wisneski and Michael T. Morman for "Polyolefin-Containing Extrudable Compositions and Methods for Their Formation Into Elastomeric Products", the contents of which have been previously incorporated herein by reference. For example, utilizing a composition containing, by weight, 67% KRATON®G-1657, 22% PE Na601 and 11% REGALREZ®1126, such composition was meltblown with the composition at a temperature of 520° F. Generally, and intended to be illustrative and not limiting, the following described parameters can be used for meltblowing of the extrudable compostions of the present invention. Thus, the extrudable composition can be meltblown while at a temperature of 500° to 600° F., preferably 525° to 575° F., during the meltblowing. The primary air temperature, during the meltblowing, can be 500° to 650° F., preferably 550° to 600° F.; and the primary air pressure can be 2-8 pounds per square inch (psi), gage, preferably 4-5 psi, gage.

With respect to forming the laminate, various gatherable materials can be utilized; in connection therewith, attention is directed to U.S. patent application Ser. No. 760,437, filed July 30, 1985, of Jack D. Taylor and Michael J. Vander Wielen for "Composite Elastomeric Material and Process for Making the Same", the contents of which have previously been incorporated herein by reference. The gatherable web materials can include, but are not limited to, non-elastic webs such as bonded carded non-elastic polyester or non-elastic polypropylene fiber web, spunbonded non-elastic polyester or polypropylene non-elastic fiber web, non-elastic cellulosic fiber webs, e.g., cotton fiber webs, polyamide fiber webs, e.g., nylon 6-6 webs sold under the trademark CEREX by Monsanto, and blends of two or more of the foregoing. Of particular desirability is utilizing the gatherable web as outer cover layers (e.g., as a sandwich wherein the elastomeric web is the intermediate layer with cover layers of the gatherable web). The basis weight of the gatherable web(s) depends on various factors including the retraction force of the elastic web and the desired retraction by the elastic web. Exemplary, and not limiting, values for the basis weight of the gatherable web(s) are 5-100 grams per square meter (gsm), preferably 10-30 gsm.

A preferred material for the gatherable web is spunbond polypropylene. In this regard, previous KRATON®/polyethylene blends could not be acceptably bonded to webs of spunbond polypropylene as the gatherable web. By the present invention, utilizing the tackifying resin as part of the composition with the elastomeric polymer and polyethylene extruded to form an elastomeric web having adhesive properties, the capability of bonding the elastomeric webs to webs of other polymers, including spunbond polypropylene, is achieved.

Reference is made to FIG. 1 of the drawings, in connection with the discussion of the stretch bonded laminating procedure. This FIG. 1 shows schematically a continuous manufacturing in-line process for stretch-bond laminating gatherable webs, which may be non-elastic webs, to each of the two opposite sides of a stretchable elastic web. Thus, the elastic web 3 of the present invention was formed by conventional melt-blown equipment 1 on a forming wire 2, and travels in the direction indicated by the arrows associated with the rolls for the forming wire 2. The web 3 then passes through the bonder (rolls 6 and 7). The bonder roll arrangement can be comprised of a patterned calender roller 6 and a smooth anvil roller 7. Various bonder roll arrangements, known in the art, can be used. The first gatherable substrate web 4 is unwound from a supply roll, as is the second gatherable substrate web 5. First web 4 and second web 5 travel in the direction indicated by the arrows associated with webs 4 and 5, respectively. Elastic web 3 is stretched to a desired percent elongation between wire 2 and bonder 6 and 7, by having the bonding rolls rotating at a faster speed than the forming wire 2. The pressure between the rollers 6 and 7 bonds the webs (4 and 5) to elastic web 3 to form a composite elastic material 8. As can be seen in FIG. 1, the elastic material relaxes upon relaxation of the stretching provided by the bonding rolls, whereby the gatherable webs are gathered in the composite elastic material 8. The web 8 is then wound up on a winder 9.

As can be appreciated, the bonding between the gatherable webs and the elastic web is a point bonding. Various bonding patterns can be used, depending upon the desired tactile properties of the final composite laminate material. Such bonding can be performed at temperatures as low as 60° F., for example. A range of temperatures for the calender rolls during bonding is 60° to 180° F., preferably 100° to 140° F. In this regard, the bonding can be performed without heating the calender rolls; however, without heating the calender rolls there would be substantially no control of the temperature of the webs during bonding. Accordingly, it is preferred to heat the bonder (the calender rolls) to a temperature in the range of 100° to 140° F. to control the temperature of the webs during bonding. As can be appreciated, in such temperature range (100° to 140° F.) bonding is provided by the tackiness of the elastic web (that is, the temperature is not so high as to cause softening of the elastic web and bonding primarily due to such softening). An advantage of the present invention is that due to the relatively low temperatures which can be used in the bonding step of the present invention, smaller distances between the bonding points can be used in the present invention, as compared with the distances used in conventional laminating techniques. Generally, the bonder rolls press against the laminate of webs such that the pressure between the rolls 6 and 7 is, for example, 100–500 pounds per linear inch (pli), preferably 250–350 pli. These pressures are about the same as utilized in conventional techniques to form composite elastic materials.

As specific conditions of the stretch bond laminating, and referring to Example II below, the forming wire 2 speed was 50 feet per minute (fpm); the bonder rollers 6 and 7 were going 153 fpm; and the winder was going 73 fpm.

The following specific examples of the present invention exemplify formation of a fibrous meltblown nonwoven elastomeric web and use of such web to form a stretch bonded laminate, as indicated previously. Of course, the present invention is not limited to such examples, the examples merely being exemplary of the present invention.

In the following examples, on-line apparatus as shown in, e.g., FIG. 1 was used. As for the meltblowing die structure, reference is made to the U.S. patent application Ser. No. 760,698, filed July 30, 1985, of Tony J. Wisneski and Michael T. Morman, for "Polyolefin-Containing Extrudable Compositions and Methods for Their Formation into Elastomeric Products", particularly FIG. 3 thereof. The melt-blowing die had apertures of 0.0145 inch, with 30 apertures per inch. The air gap (between the die tip and air plate) of the meltblowing die was 0.063 inch, and the distance the tip of the die extended beyond the air plate was 0.008 inch. Moreover, in the examples spunbond polypropylene, having a basis weight of 0.40 oz/yd$^2$, was used for the gatherable webs, with gatherable webs being applied to both sides of the elastic web.

Example I

A blend of, by weight, 62.5% KRATON ®G-1657; 25% polyethylene Na601; and 12.5% REGALREZ ®1126 was meltblown under the conditions of a melt temperature of 531° F.; a primary (forming) air temperature of 595° F. and a primary (forming) air pressure of 4 pounds per square inch, gauge. The forming distance between the dies for the meltblowing and the forming wire was 10 inches. After formation of the meltblown web, the web was then passed directly to the stretch bond laminating. In this regard, attention is directed to FIG. 1. For such stretch bond laminating, the forming wire traveled at a speed of 53 fpm; the bonder traveled at a speed of 158 fpm and the winder traveled at a speed of 73 fpm. The bonder was at a temperature of 120° F., with a bonding pressure of 150 pli.

Example II

A blend of, by weight, 63% KRATON ®G-1657, 20% polyethylene Na601 and 17% REGALREZ ®1126 was meltblown under the conditions of a melt temperature of 530° F. and a primary air temperature of 600° F. The primary air pressure was 4 pounds per square inch, gauge, with a forming distance from the dies to the forming wire of 10 inches. The formed meltblown web was then passed directly to the stretch bond laminating, with the forming wire traveling at a speed of 50 fpm, the bonder traveling at a speed of 153 fpm and the winder traveling at a speed of 73 fpm. The bonder was at a temperature of 140° F., with the pressure of the bonder being 280 pli.

Comparative Example I

A composition of, by weight, 60% KRATON ®G-1657 and 40% polyethylene Na601, with no tackifier, was meltblown under the conditions of a melt temperature of 535° F., a primary air temperature of 603° F., a primary air pressure of 4 pounds per square inch, gauge, and a forming distance between the dies and forming wire of 14 inches. The formed meltblown web was then passed directly to the stretch bond laminating, the forming wire traveling at a speed of 50 fpm, the bonder traveling at a speed of 150 fpm and the winder traveling at a speed of 75 fpm. The bonder was at a temperature of 180° F., with the bonder having a pressure of 150 pli.

The characteristics of the meltblown web and stretch bonded laminate, formed in the above-three Examples, are set forth below in Table 6.

The physical characteristics (machine direction physical characteristics) of the fibrous nonwoven (meltblown) webs and stretch bonded laminates formed by the processes detailed in Examples I and II, and Comparative Example I, as shown in Table 6, were determined by the utilization of an Instron tensile tester model 1130. Each sample was 3 inches wide (transverse machine direction) by 7 inches long (machine direction). Each sample was placed lengthwise in the Instron's jaws with an initial jaw separation setting of 4 inches. The following tests were then carried out, with the results shown in Table 6.

(1) The sample was then stretched at a rate of 20 inches per minute, to determine the load, in grams, required to elongate such sample 100 percent in the machine direction. That is, the load in grams required to elongate each sample to a machine direction length of twice its unstretched machine direction length was determined, for purposes of finding the load at 100% elongation.

(2) Load at 500% elongation was determined by finding the load, in grams, required to elongate each sample to a machine direction length of five times its unstretched machine direction length.

(3) Percent elongation at 1000 grams is the percent the sample stretches when a 1000 gram force is applied in the machine direction.

(4) Load at 50% elongation was determined by finding the load, in grams, required to elongate each sample to a machine direction length 50% over its unstretched machine direction length.

(5) The internal cohesion test consisted of measuring the peak load obtained while pulling a stretch bonded laminate apart between two pressure plates covered with double coated pressure sensitive tape. The test indicates the force required to delaminate the stretch bonded laminate.

TABLE 6

|  | Example I | Example II | Comparative Example I |
|---|---|---|---|
| Meltblown Attributes |  |  |  |
| Basis Weight | 76 GSM | 72 GSM | 75 GSM |
| Load @ 100% Elongation | 448 Gms/3" | 392 Gms/3" | 983 Gms/3" |
| Load @ 500% Elongation | 875 Gms/3" | 828 Gms/3" | 449 Gms/3" |
| SBL Attributes |  |  |  |
| Basis Weight | 162 GSM | 130 GSM | 130 GSM |
| % Elong. @ 1000 Gms | 123% | 117% | 102% |
| Load @ 50% Elongation | 452 Gms/3" | 556 Gms/3" | 507 Gms/3" |
| Internal Cohesion | 3.9 Kilograms | 6.1 Kilograms | 2.3 Kilograms |

GSM = grams per square meter

As can be seen in the foregoing Table, incorporation of, or increase in the amount of, the tackifying resin clearly increases the cohesion of the stretch bonded laminate. Moreover, use of such tackifier resin enables the bonder to be operated at a lower temperature.

Accordingly, the present invention provides the following advantageous effects:

(1) Due to the lower bonding temperature, there are less web breaks during the bonding;

(2) Capability of bonding to many different types of outer layers, including, specifically, spunbonded polypropylene, is achieved;

(3) A higher elongation is attainable in the stretch bonded laminate because of lower permanent set due to lower bonding temperatures; and (4) The resulting fabric has machine direction stretch as well as good internal cohesion.

While the present invention has been described in terms of various embodiments thereof, the present invention is not to be limited thereto, but is capable of various embodiments within the skill of the ordinary worker in the art. For example, the formulations are not limited to the specific embodiments, but could include other ratios and polymers to achieve the same end. Thus, ethylene vinyl acetate or other hydrogenated styrene-type polymers could be used in the composition.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

What is claimed is:

1. A nonwoven elastomeric web comprising fibers formed from a blend including a thermoplastic elastomeric polymer and a tackifying resin, wherein said web is adapted to form a bond to a sheet of spunbonded polypropylene in the temperature range of from about 60 degrees F. to about 180 degrees F., said bond having an internal cohesion of at least about 3.9 kilograms.

2. The nonwoven elastomeric web according to claim 1, wherein the thermoplastic elastomeric polymer comprises an elastomeric block copolymer.

3. The nonwoven elastomeric web according to claim 2, wherein the elastomeric block copolymer comprises an A-B-A' block copolymer where A and A' are the same or different thermoplastic endblocks and comprise a styrenic moiety and B is a rubbery poly(ethylene-butylene) block.

4. The nonwoven elastomeric web according to claim 3, wherein said blend further includes a polyolefin.

5. The nonwoven elastomeric web according to claim 4, wherein the polyolefin is selected from the group consisting of polyethylene, polypropylene, polybutene, ethylene copolymers, propylene copolymers, butene copolymers, and mixtures thereof.

6. The nonwoven elastomeric web according to claim 1, wherein said tackifying resin is selected from the group including hydrogenated hydrocarbon resins and turpene hydrocarbon resins.

7. The nonwoven elastomeric web according to claim 5, wherein said blend comprises from about 40 to about 80 percent, by weight, of said A-B-A' block copolymer, from about 5 to about 40 percent, by weight, of said polyolefin and from about 5 percent to about 30 percent, by weight, of said tackifying resin.

8. The nonwoven elastomeric web according to claim 6, wherein said tackifying resin comprises a hydrogenated hydrocarbon resin having a melt viscosity of about 100 poises in the range of from about 126 degrees C. to about 159 degrees C.

9. The nonwoven elastomeric web according to claim 6, wherein said tackifying resin comprises a hydrogenated hydrocarbon resin having a softening point in the range of from about 94 degrees C. to about 126 degrees C.

10. The nonwoven elastomeric web according to claim 6, wherein said tackifying resin comprises a hydrogenated hydrocarbon resin having a molecular weight from about 650 to about 1,000.

11. The nonwoven elastomeric web according to claim 6, wherein said tackifying resin comprises a turpene hydrocarbon resin having a softening point of about 105 degrees C., a specific gravity of about 1.02 and a flash point of about 480 degrees F.

12. The nonwoven elastomeric web according to claim 1, wherein said fibers are microfibers.

13. A nonwoven elastomeric web comprising fibers formed from a blend including a thermoplastic elastomeric polymer and a tackifying resin, wherein said web is adapted to form a bond to a sheet of spunbonded polypropylene in the temperature range of from about 100 degrees F. to about 140 degrees F., said bond having an internal cohesion of at least about 3.9 kilograms.

14. The nonwoven elastomeric web according to claim 13, wherein the thermoplastic elastomeric polymer comprises an elastomeric block copolymer.

15. The nonwoven elastomeric web according to claim 14, wherein the elastomeric block copolymer comprises an A-B-A' block copolymer where A and A' are the same or different thermoplastic endblocks that comprise a styrenic moiety and B is a rubbery poly-(ethylene-butylene) block.

16. The nonwoven elastomeric web according to claim 15, wherein said blend further includes a polyolefin.

17. The nonwoven elastomeric web according to claim 16, wherein the polyolefin is selected from the group consisting of polyethylene, polypropylene, polybutene, ethylene copolymers, propylene copolymers, butene copolymers, and mixtures thereof.

18. The nonwoven elastomeric web according to claim 17, wherein said blend comprises from about 40 to about 80 percent, by weight, of said A-B-A' block copolymer, from about 5 to about 40 percent, by weight, of said polyolefin and from about 5 percent to about 30 percent, by weight, of said tackifying resin.

19. The nonwoven elastomeric web according to claim 13, wherein said tackifying resin is selected from the group including hydrogenated hydrocarbon resins and turpene hydrocarbon resins.

20. The nonwoven elastomeric web according to claim 19, wherein said tackifying resin comprises a hydrogenated hydrocarbon resin having a melt viscosity of about 100 poises in the range of from about 126 degrees C. to about 159 degrees C.

21. The nonwoven elastomeric web according to claim 19, wherein said tackifying resin comprises a hydrogenated hydrocarbon resin having a softening point in the range of from about 94 degrees C. to about 126 degrees C.

22. The nonwoven elastomeric web accordinag to claim 19, wherein said tackifying resin comprises a hydrogenated hydrocarbon resin having a molecular weight from about 650 to about 1,000.

23. The nonwoven elastomeric web according to claim 19, wherein said tackifying resin comprises a turpene hydrocarbon resin having a softening point of about 105 degrees C., a specific gravity of about 1.02 and a flash point of about 480 degrees F.

24. The nonwoven elastomeric web according to claim 13, wherein said fibers are microfibers.

25. A nonwoven elastomeric web comprising fibers formed from a blend including a thermoplastic elastomeric polymer and a tackifying resin, wherein said web is adapted to form a bond to a sheet of spunbonded polypropylene at about ambient temperature, said bond having an internal cohesion of at least about 3.9 kilograms.

26. The nonwoven elastomeric web according to claim 25, wherein the thermoplastic elastomeric polymer comprises an elastomeric block copolymer.

27. The nonwoven elastomeric web according to claim 26, wherein the elastomeric block copolymer comprises an A-B-A' block copolymer where A and A' are the same or different thermoplastic endblocks that contain a styrenic moiety and B is a rubbery poly(ethylene-butylene) block.

28. The nonwoven elastomeric web according to claim 27, wherein said blend further includes a polyolefin.

29. The nonwoven elastomeric web according to claim 28, wherein the polyolefin is selected from the group consisting of polyethylene, polypropylene, polybutene, ethylene copolymers, propylene copolymers, butene copolymers, and mixtures thereof.

30. The nonwoven elastomeric web according to claim 29, wherein said blend comprises from about 40 to about 80 percent, by weight, of said A-B-A' block copolymer, from about 5 to about 40 percent, by weight, of said polyolefin and from about 5 percent to about 30 percent, by weight, of said tackifying resin.

31. The nonwoven elastomeric web according to claim 25, wherein said tackifying resin is selected from the group including hydrogenated hydrocarbon resins and turpene hydrocarbon resins.

32. The nonwoven elastomeric web according to claim 31, wherein said tackifying resin comprises a hydrogenated hydrocarbon resin having a melt viscosity of about 100 poises in the range of from about 126 degrees C. to about 159 degrees C.

33. The nonwoven elastomeric web according to claim 31, wherein said tackifying resin comprises a hydrogenated hydrocarbon resin having a softening point in the range of from about 94 degrees C. to about 126 degrees C.

34. The nonwoven elastomeric web according to claim 31, wherein said tackifying resin comprises a hydrogenated hydrocarbon resin having a molecular weight from about 650 to about 1,000.

35. The nonwoven elastomeric web according to claim 31, wherein said tackifying resin comprises a turpene hydrocarbon resin having a softening point of about 105 degrees C., a specific gravity of about 1.02 and a flash point of about 480 degrees F.

36. The nonwoven elastomeric web according to claim 25, wherein said fibers are microfibers.

* * * * *

UNITED STATES PATENT AND TRADEMARK OFFICE
CERTIFICATE OF CORRECTION

PATENT NO. : 4,789,699
DATED : December 6, 1988
INVENTOR(S) : John S. Kieffer and Tony J. Wisneski It is certified that error appears in the above—identified patent and that said Letters Patent is hereby corrected as shown below:

In Column 9, Line 9, please delete "(A+A")" and replace with -- (A+A') --.

Signed and Sealed this

Twenty-sixth Day of September, 1989

Attest:

DONALD J. QUIGG

Attesting Officer

Commissioner of Patents and Trademarks